(12) United States Patent
Li (10) Patent No.: US 7,361,009 B2
(45) Date of Patent: Apr. 22, 2008

(54) MOLD CAVITY INSERT FOR USE IN AN INJECTION MOLD

(75) Inventor: Guoming Li, Mississauga (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 264 days.

(21) Appl. No.: 11/254,325

(22) Filed: Oct. 20, 2005

(65) Prior Publication Data

US 2007/0092596 A1    Apr. 26, 2007

(51) Int. Cl.
*B29C 45/72*    (2006.01)
(52) U.S. Cl. ........................ 425/547; 425/548
(58) Field of Classification Search ........ 425/546, 425/547, 548
See application file for complete search history.

(56) References Cited

U.S. PATENT DOCUMENTS 5,443,381 A    8/1995    Gellert
6,079,972 A    6/2000    Gellert
6,176,700 B1   1/2001    Gellert
6,413,075 B1   7/2002    Koch
6,443,216 B1   9/2002    Lombard et al.
6,488,881 B2   12/2002   Gellert
6,737,007 B2   5/2004    Neter et al.
6,916,168 B2   7/2005    Romanski et al.

FOREIGN PATENT DOCUMENTS

JP    10128839    5/1998

OTHER PUBLICATIONS

International Search Report for PCT/CA2006/001506, dated Nov. 29, 2006, four pages, related to the above-identified US patent application.

*Primary Examiner*—Tim Heitbrink (57) ABSTRACT

Disclosed herein is a mold, a molding system and a cooling component. The mold and the molding system use the cooling component. The mold includes a mold cavity plate configured to receive a mold cavity insert. The cooling component includes a jacket configured to define, in combination with the mold cavity insert and the mold cavity plate, a coolant-conveying channel.

62 Claims, 9 Drawing Sheets

MOLD CAVITY INSERT FOR USE IN AN INJECTION MOLD

FIELD OF THE INVENTION

The present invention relates generally to injection molding and particularly relates to an apparatus for cooling an article in a mold.

BACKGROUND

Injection molding is a commonly employed manufacturing technique for forming articles. An example of an article that is typically formed using injection molding is a plastic preform. A plastic preform can then be subsequently blow-molded into a plastic bottle.

An injection mold for making preforms (and other articles) typically includes one or more molding cavities for receiving molten plastic and forming the preforms. The cavities are usually defined between complementary cylindrically-shaped mold cavity inserts. The injection mold also includes a mold shoe, typically comprising a set of plates, within which the mold cavity inserts are arranged. The injection mold also includes a hot runner for communicating a flow of the molten plastic into the molding cavities.

The molten plastic injected into the cavities must be cooled to solidify the molten plastic so that the molded preform can be removed from the mold. It is desirable to cool the preform as quickly as possible so the preforms can be removed and a next injection cycle initiated with minimal time delay. As the mold cavity inserts are in direct contact with the molten plastic they become heated by it and need to be cooled. In the prior art, cooling of the mold cavity inserts was typically achieved by creating a cooling channel in an exterior surface of the mold cavity insert. Typically, such a channel is a spiral, but it can be any shape that directs a flow of coolant about the exterior of the mold cavity insert.

Those of skill in the art recognize that the mold cavity insert needs to withstand enormous pressures as the molten plastic is injected. Of note, however, since the cooling channel is integrally formed on the mold cavity insert, the stresses along the length of the mold cavity insert are non-uniform. Indeed, stress gradients at various points along the path of the channel of the mold cavity inserts can be observed. The stress is often the greatest where the cooling channel makes abrupt changes in direction.

In order to reduce the likelihood of catastrophic failure of the mold cavity insert due to excessive stress, the wall thickness of the mold cavity insert is increased to provide sufficient structural strength to withstand injection pressures. In at least certain prior art mold cavity inserts, the wall thickness of the mold cavity inserts are at least about 6.4 millimeters. However, since injection molds are typically made available with a standardized number and arrangement of molding cavities, a minimum permissible wall thickness of the mold cavity insert limits the maximum size of the preform or other article that can be formed therein.

Figure 1:
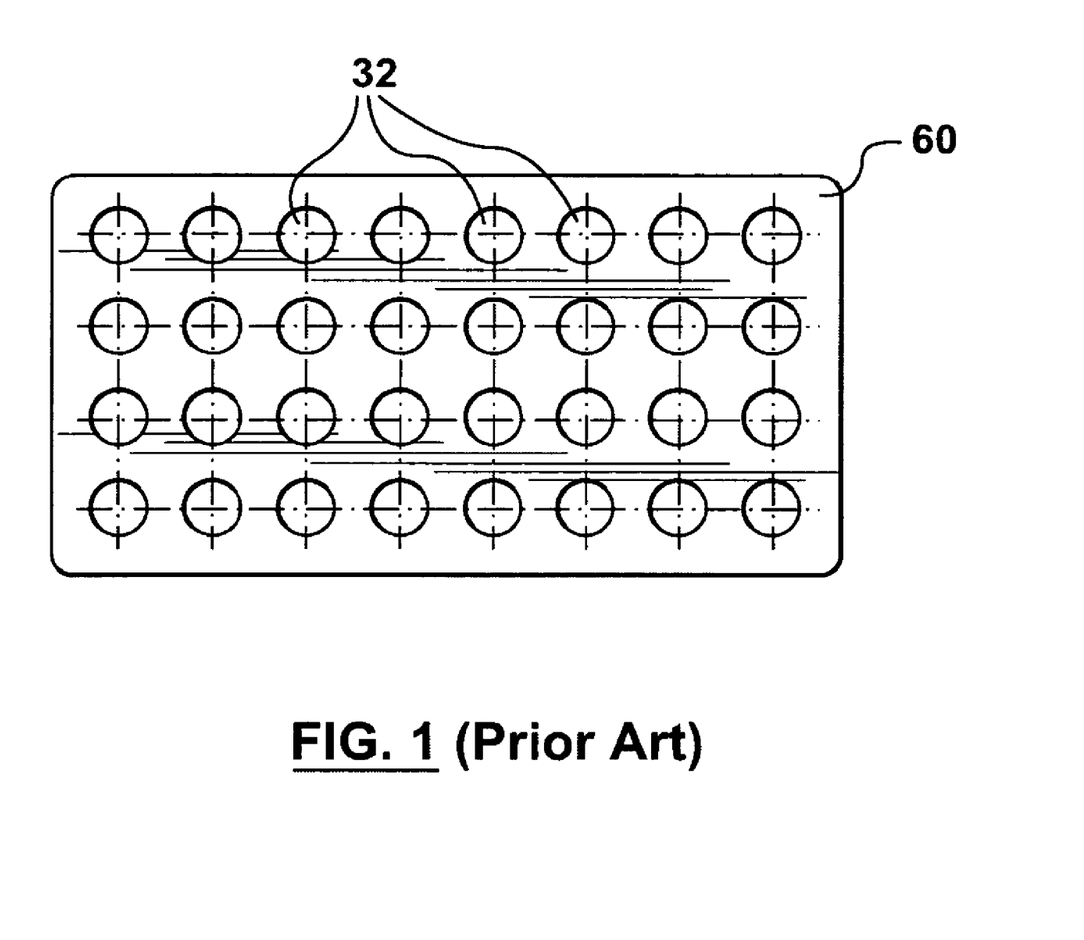
FIG. 1 is the front view of the known cavity plate.

FIG. 1 is a front view of a known injection mold cavity plate 60. The plate 60 includes a matrix of openings or bores 32 for receiving a plurality of mold stack assemblies (not depicted). In the present example, the matrix 60 is depicted as having four rows and eight columns. The size of the matrix 60 is determined by many factors such as the size of a molding machine (not depicted), the maximum size of the mold and the size of the articles to be made. The matrix 60 in the present example would accommodate a total of thirty-two mold stack assemblies.

Figure 2:
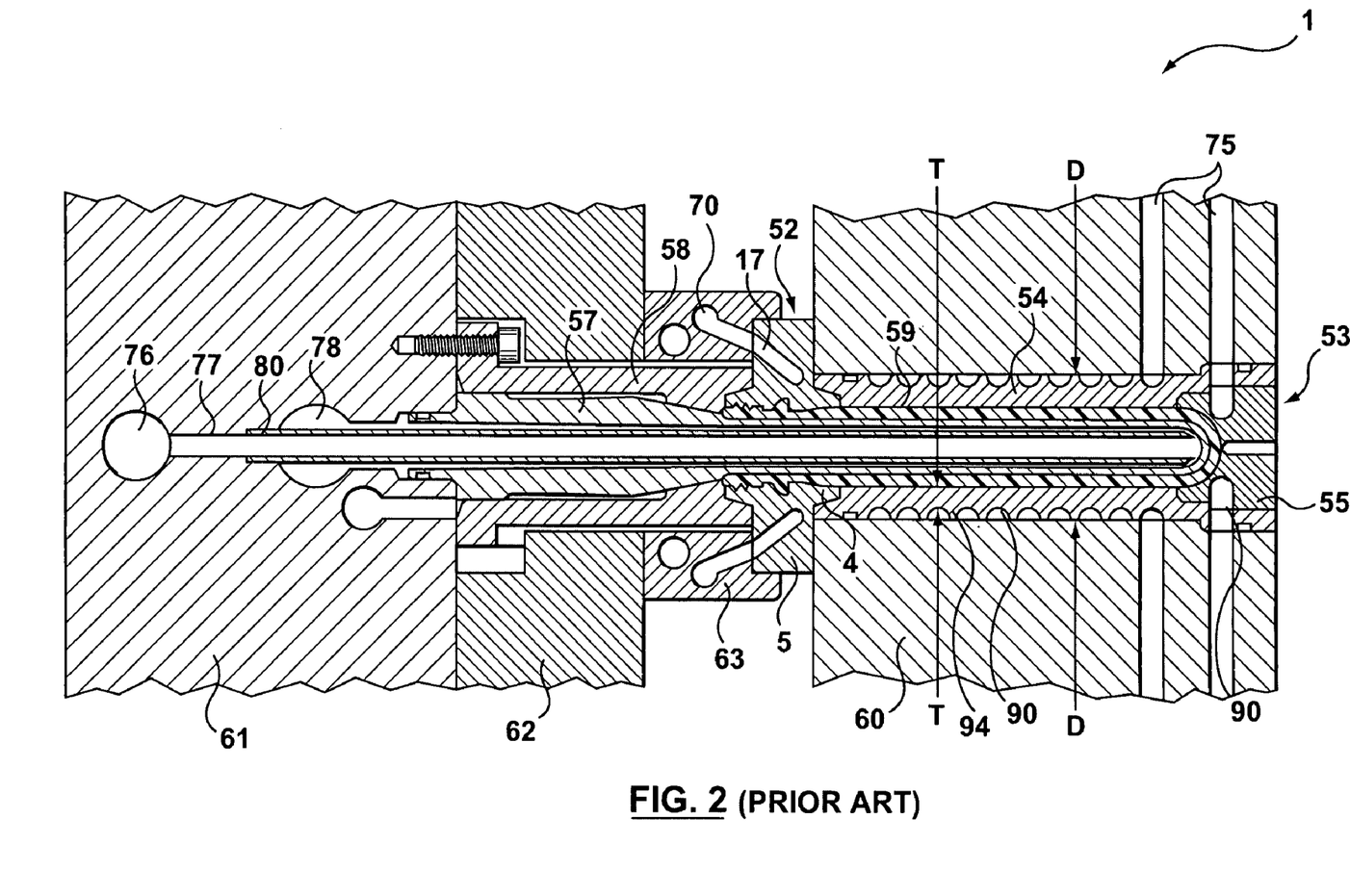
FIG. 2 is the partial sectional view of the known injection mold in use with the cavity plate of FIG. 1.

FIG. 2 is a partial sectional view of a known injection mold 1 in use with the cavity plate 60 of FIG. 1. The mold 1 is depicted with a known molding stack assembly 53. The stack assembly 53 includes a mold cavity insert 54 with an outside diameter D, a gate insert 55, a neck ring pair 52, a core insert 57, and a locking ring 58 that are configured to cooperate to provide a molding cavity 59 along a set of molding surfaces disposed thereon. Molding cavity 59 thus provides a chamber within which a preform 4 can be formed. (Other configurations of cavity 59 would thus permit the formation of other articles other than preform 4). The mold shoe includes a cavity plate 60, a core plate 61, a stripper plate 62, and a slide pair 63.

In more detail, the core insert 57 is arranged on a front surface of the core plate 61 and retained thereon by the lock ring 58. The core plate 61 includes core coolant channels 76, 77 and 78 for connecting with a coolant channel configured within the core insert 57.

Core coolant channels 76, 77 and 78 further interconnect with core cooling tube 80. As can be seen, the entire inside of the molding cavity 59 extends along the molding surface of core insert 57. Coolant channels 70 and 17 provide coolant to one half of slide pair 63 and neck ring pair 52.

The mold cavity insert 54 is arranged within a bore in cavity plate 60. The gate insert 55 is arranged within a bore configured in a top portion of the mold cavity insert 54.

As can be seen, a substantial portion of the outside of the molding cavity 59 extends along the interior surfaces of mold cavity insert 54 and a smaller portion along gate insert 55.

Cavity plate 60 also includes coolant channels 75 for connecting with a coolant channel 90 that is configured around the periphery of mold cavity insert 54 to form a cooling circuit. The cooling channel 90 is defined on one side by the bore within cavity plate 60 and on the other side by a plurality of dividers 94 integrally formed in the wall of the mold cavity insert 54.

Figure 3:
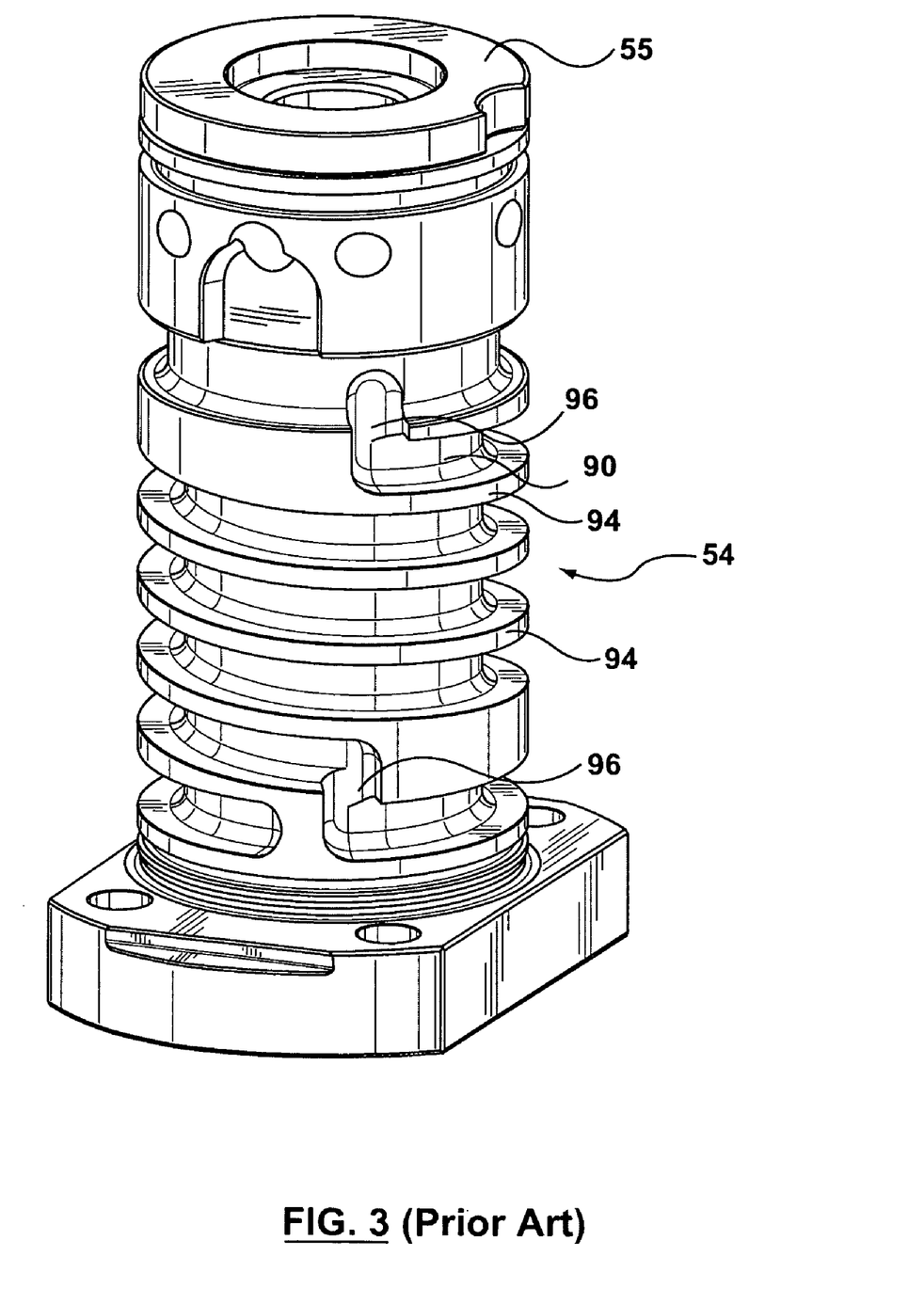
FIG. 3 is the perspective view of the known alternative mold cavity insert and gate insert.

FIG. 3 is a perspective view of another known embodiment mold cavity insert 55 and gate insert 55 for use with the injection mold 1 of FIG. 2. The coolant channel 90 is substantially spiral, but is also characterized by two longitudinal channels 96. Each longitudinal channel 96 represents a substantial change in direction of the coolant flow in relation to the remainder of channel 90.

During injection molding to form the article, the presence of the cooling channel 90 in the mold cavity insert 54 and, particularly, the longitudinal channels 96, create greater stress concentrations in areas of the cavity insert 54 than would be the case if the coolant channel 90 was not present. Accordingly, the wall thickness T of the mold cavity insert 54 is clearly dictated to prevent mechanical failure of the mold cavity insert 54 in the areas of highest stress concentrations. As best seen in FIG. 2, the wall thickness T is typically the distance between the molding surface of the mold cavity 59 and the bottom of the cooling groove 90 in mold cavity insert 54. For a typical mold having a cavity insert of the type shown as mold cavity insert 54, the minimum wall thickness T for the mold cavity insert 54 is at least about 6.4 millimeters. As the diameter of the bore, of the openings 32, in a given cavity plate 60 is generally fixed, the mold is limited to forming parts that have an outside diameter that is limited by the wall thickness of the inert. If the thickness of the insert and its associated coolant channel can be reduced then parts having a larger diameter could be molded without having to modify the cavity plate.

SUMMARY

In a first aspect of the present invention, there is provided a novel apparatus for cooling a mold. The apparatus includes a jacket receivable within a bore of a cavity plate and a mold cavity insert coaxially receivable within the jacket such that the jacket, the bore and the insert collectively provide a channel for carrying a coolant along a periphery of the insert.

In a second aspect of the present invention, there is provided a molding system that comprises a jacket configured to cooperate with a mold cavity plate of a mold, the molding plate configured to receive a mold cavity insert, the jacket configured to define, in combination with the mold cavity insert and the mold cavity plate, a coolant-conveying channel.

In a third aspect of the present invention, there is provided a molding system that comprises a mold cavity plate, the mold cavity plate configured to cooperate with a jacket, the molding plate configured to receive a mold cavity insert, the jacket configured to define, in combination with the mold cavity insert and the mold cavity plate, a coolant-conveying channel.

In a fourth aspect of the present invention, there is provided a mold that comprises a jacket configured to cooperate with a mold cavity plate, the molding plate configured to receive a mold cavity insert, the jacket configured to define, in combination with the mold cavity insert and the mold cavity plate, a coolant-conveying channel.

In a fifth aspect of the present invention, there is provided a mold that comprises a mold cavity plate of a mold, the mold cavity plate configured to cooperate with a jacket, the molding plate configured to receive a mold cavity insert, the jacket configured to define, in combination with the mold cavity insert and the mold cavity plate, a coolant-conveying channel.

In a sixth aspect of the present invention, for a mold of a molding system, the mold having a mold cavity plate configured to receive a mold cavity insert, there is provided a cooling component that comprises a jacket configured to define, in combination with the mold cavity insert and the mold cavity plate, a coolant-conveying channel.

A technical effect of the aspects of the present invention is that the jacket allows for a reduction in a thickness of the mold cavity insert and/or a reduction in a thickness of the coolant channel, such that articles having a larger diameter may be molded by the mold without having to modify the cavity plate.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

DETAILED DESCRIPTION OF THE EXEMPLARY EMBODIMENTS

Figure 4:
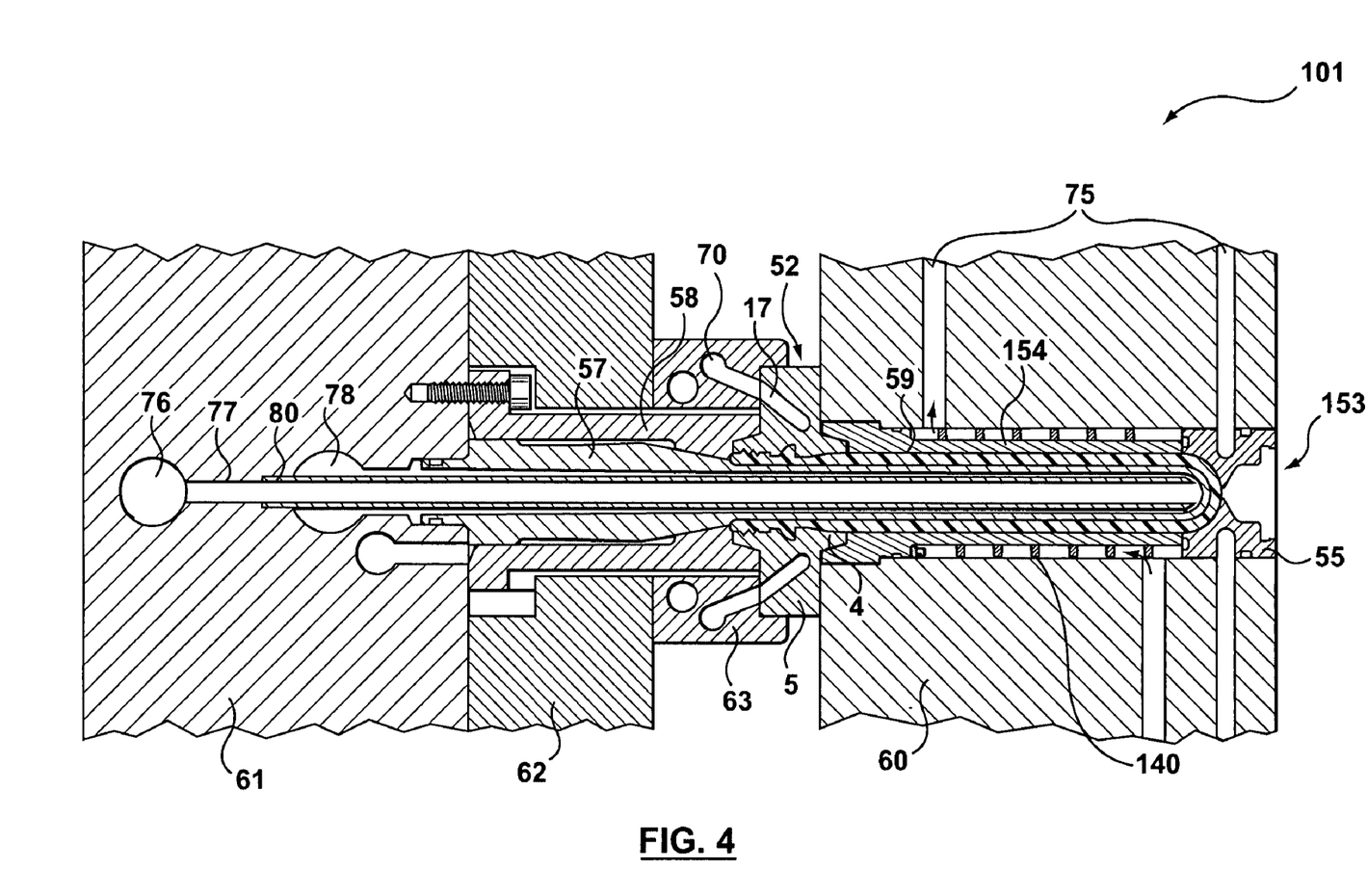
FIG. 4 is a partial sectional view of an injection mold that includes a mold cavity insert according to the first embodiment.

FIG. 4 is the partial sectional view of an injection mold 101 that shows a stack assembly 153 that includes a mold cavity insert 154 according to the first embodiment. The components in FIG. 4 that are similar to components in FIG. 2 bear the same reference for sake of simplifying the description of the embodiment. However, there are notable exceptions to the components depicted in FIG. 4, as described below.

Figure 5:
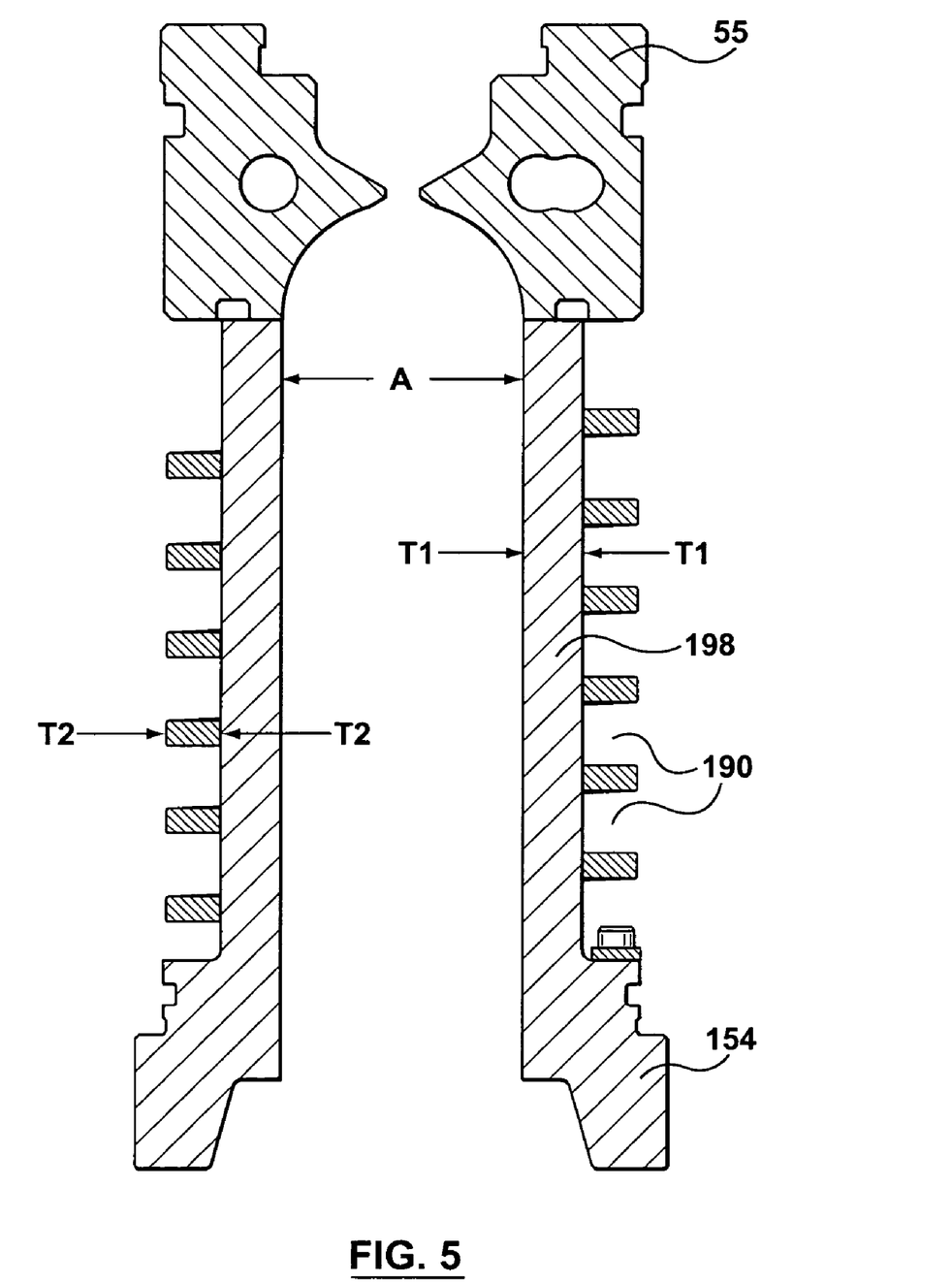
FIG. 5 is a sectional view of the mold cavity insert and a gate insert of FIG. 4.

FIG. 5 is the sectional view of the mold cavity insert 154 of FIG. 4. The mold cavity insert 154 is a cylinder having a wall 198 of substantially uniform wall thickness T1.

Since wall thickness T1 is substantially uniform, insert 154 does not experience the same unequal stresses that exist in the prior art insert 54 of FIG. 2.

Figure 6:
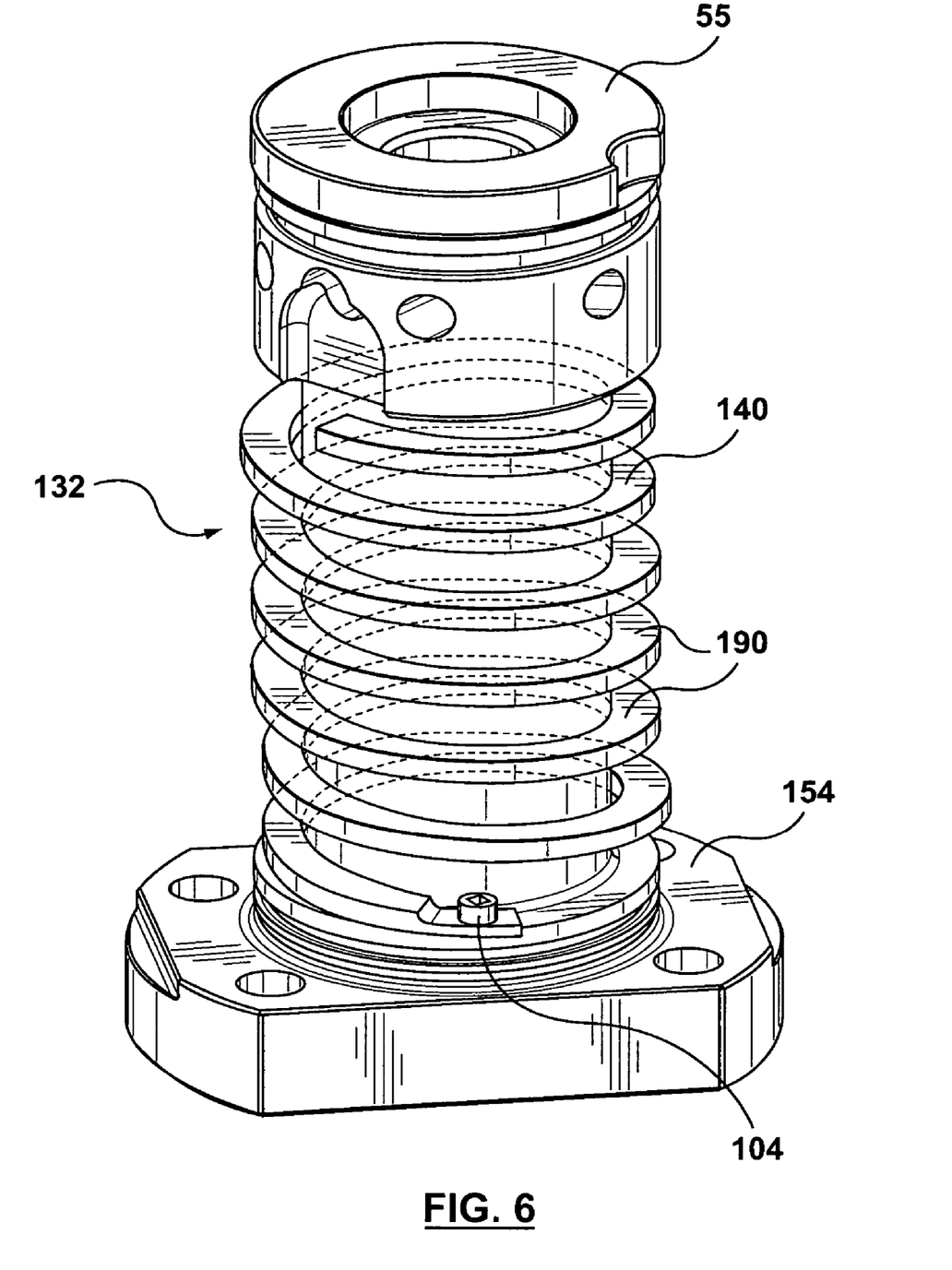
FIG. 6 is a first perspective view of the mold cavity insert and gate insert of FIG. 4.

FIG. 6 is the first perspective view of the mold cavity insert 154 of FIG. 4. The assembly 132 includes a jacket 140 that coaxially surrounds insert 154. Jacket 140 coaxially surrounds insert 154 to provide a coolant channel 190 along a periphery of insert 154. Coolant channel 190 is, itself, defined by the bore within cavity plate 60 and wall 198 in cooperation with jacket 140.

Figure 7:
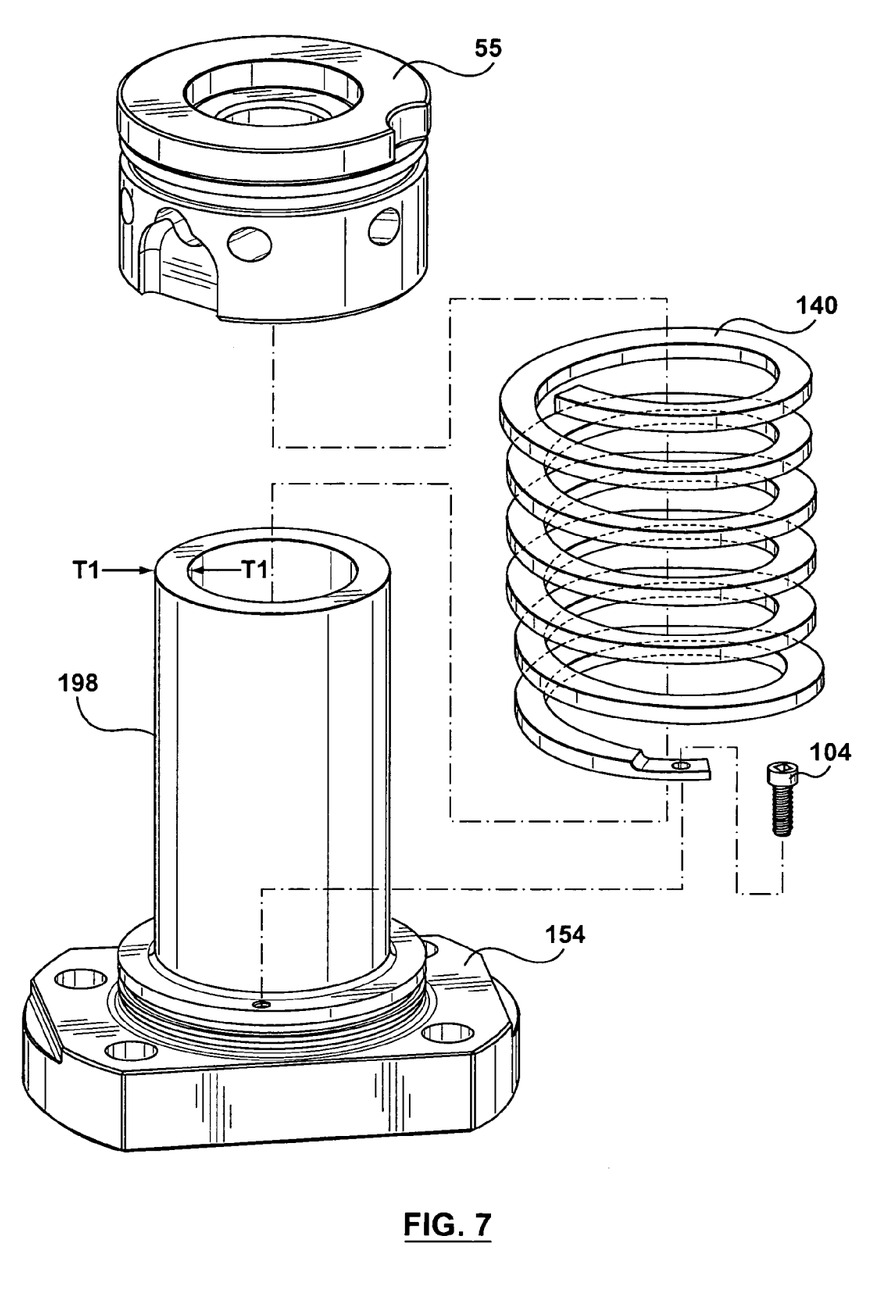
FIG. 7 is a second perspective view of the mold cavity insert, disassembled, of FIG. 4.

FIG. 7 is the second perspective view of the mold cavity insert 154, disassembled, of FIG. 4. The jacket 140 is substantially a helical coil. Jacket 140 can be made of any suitable material such as metal and plastics. In a present embodiment, jacket 140 is affixed to insert 154 with a hex bolt 104, however, jacket 140 can be cooperatively associated with insert 154 in any variety of manners that will now occur to those of skill in the art.

When fully assembled according to FIG. 4, jacket 140 preferably has an inside diameter slightly greater than the external diameter of wall 198, and jacket 140 has an outside diameter slightly smaller than the internal diameter of the bore with cavity plate 60, such that jacket 140 has an overall thickness T2 (Reference FIG. 5). Thickness T2 thus also defines the depth of cooling channel 190. Of course, the technical effect of the present invention may also be achieved from an interference fit between the foregoing diameters.

As best seen in FIG. 5, the cavity molding surface will have an outside diameter of A that typically varies along its length. As the insert 154 is a solid cylinder, with an inherently homogenous stress distribution, it can be thinner than the insert 54 and withstand the same injection pressures as the prior art insert 54. The wall thickness T1 of the insert 54 can be less than the thickness T of the prior art cavity insert 54. Thus, the maximum preform diameter A, for a given standard mold arrangement with an unchanged bore in the cavity plate, may be greater than the diameter of the preform formed in the prior art stack. Thus, parts having a larger diameter can be molded in the stack mold assembly 153 than can be molded in the stack mold assembly 53 without modifying the cavity plate in the mold. For example, in the case of a standard prior art mold with 144 cavities that are arranged with a pitch dimension of 140 mm horizontal by 50 mm vertical, the wall thickness of the cavity insert 54 wall was at least 6.4 mm and permitted a preform of a maximum diameter of 28.2 mm to be formed. Replacing the cavity insert 54 with the insert 154 and jacket 140 enabled preforms of up to 32.2 mm to be formed. Accordingly, where the cavity plate bore D=47 mm, the wall thickness of the cavity insert T1 can be 4.4 mm. Thus, wall thickness T1 can be less than thickness T, and yet insert 154 will still be able to withstand substantially the same injection pressures as insert 54. For a 50 mm pitch stack, the wall thickness T1 of the insert 154 can, in some circumstances, be as low as 3.5 mm thick. In any event, with the present invention it is possible to increase the size of the preform by reducing the thickness of the cavity insert to a thickness within the range of 3.5 to 6.4 mm.

Figure 8:
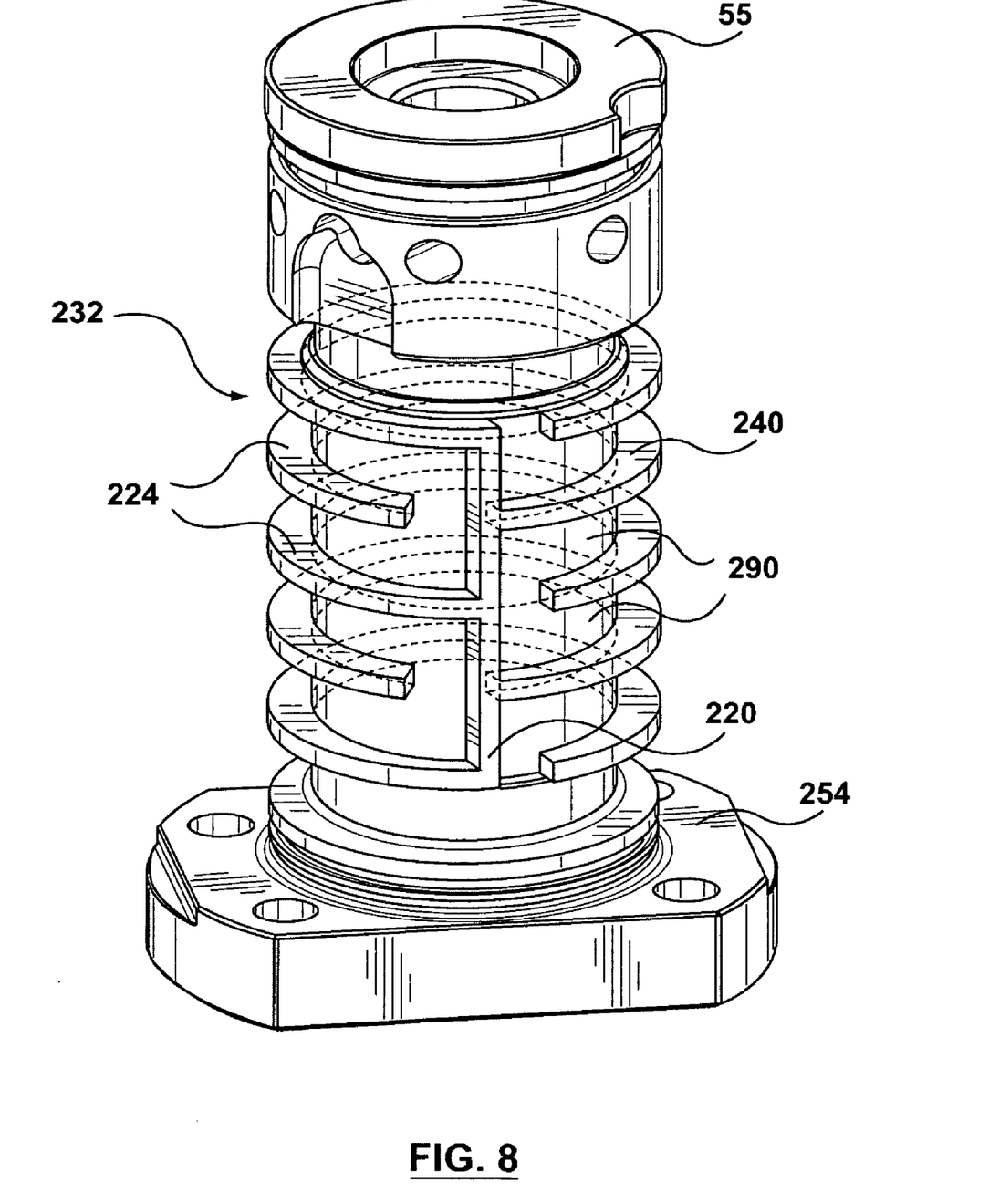
FIG. 8 is a first perspective view of the mold cavity insert according to the second embodiment.

FIG. 8 is the first perspective view of the mold cavity insert 254 according to the second embodiment.

Figure 9:
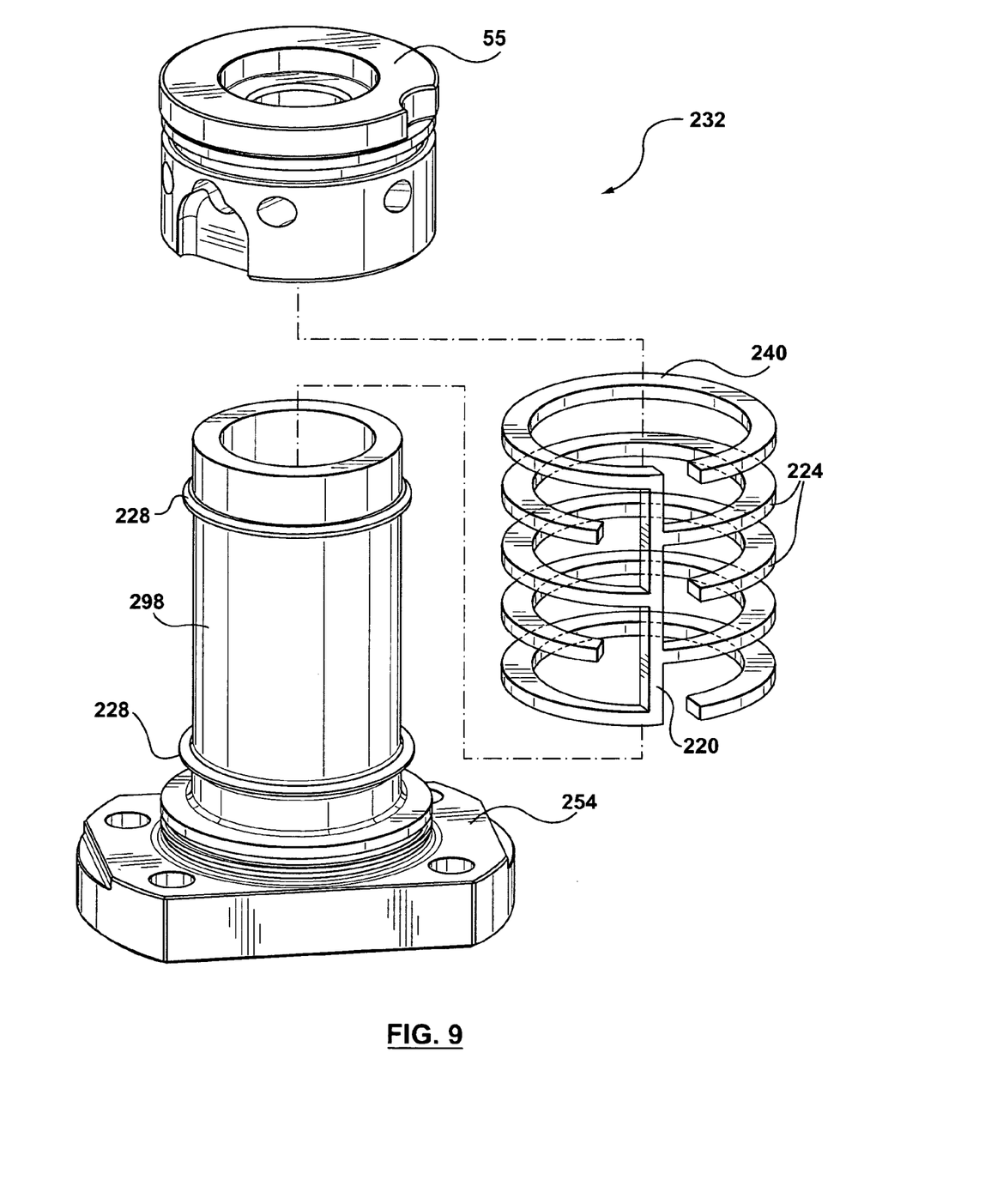
FIG. 9 is a second perspective view of the mold cavity insert, disassembled, according to the second embodiment.

FIG. 9 is the second perspective view of the mold cavity insert 254, disassembled, according to the second embodiment. A mold insert assembly in accordance with another embodiment of the invention is indicated generally at 232 and includes gate insert 55, cavity insert 254 and jacket 240. Assembly 232 is analogous to assembly 132, and thus like components in assembly 232 to like components in assembly 132 bear the same reference, except identified by an increase of 100 in the number.

Of notable difference, jacket 240 is not helical but includes a coolant channel 290 having a different pathway than coolant channel 190. In order to define channel 290, jacket 240 includes a central pillar 220, from which a plurality of non-continuous loops 224 depend transversely from alternating sides of pillar 220. Jacket 240 is retained on the outer periphery of insert 254 between a pair of annular rims 228 that project outwardly away from wall 298.

While only specific configurations and combinations of the various features and components of the present invention have been discussed herein, it will be apparent to those of skill in the art that desired subsets of the disclosed features and components and/or alternative combinations and configurations of these features and components can be utilized as desired. For example, it should now be understood that the particular configuration of a coolant channel, such as channel 190 or 290, is not particularly limited to the embodiments herein, and thus a jacket can be configured to provide any desired configuration of coolant channel that will provide the necessary and/or otherwise desired level of cooling to the insert, depending on the other factors associated with the design of the mold insert assembly. (e.g. temperature of coolant; flow rate of coolant; temperature of the injection mold material; cycle times etc.)

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims.

What is claimed is:

1. An apparatus for use in an injection mold comprising:
a jacket receivable within a bore of a mold cavity plate;
and a mold cavity insert defining a cylinder having a substantially uniform wall thickness, said mold cavity insert coaxially receivable within said jacket such that said jacket, said bore and said mold cavity insert collectively defining a channel for carrying a coolant along a periphery of said mold cavity insert.

2. The apparatus of claim 1 wherein:
said jacket is a helical coil that surrounds said mold cavity insert.

3. The apparatus of claim 2 wherein:
said helical coil is affixed to said mold cavity insert.

4. The apparatus of claim 3 wherein:
said mold cavity insert includes a pair of annular rims and said jacket is affixed to said mold cavity insert by retention between said pair of annular rims.

5. The apparatus of claim 1 wherein:
said substantially uniform wall thickness is between 3.5 and 6.4 mm.

6. The apparatus of claim 1 wherein:
said substantially uniform wall thickness is less than about 5.4 mm.

7. The apparatus of claim 1 wherein:
said substantially uniform wall thickness is about 4.4 mm.

8. The apparatus of claim 1 wherein:
said jacket includes a central pillar supporting a plurality of non-continuous loops extending transversely from alternating sides of said central pillar.

9. A molding system, comprising:
a jacket configured to cooperate with a mold cavity plate of a mold, the mold cavity plate configured to receive a mold cavity insert defining a cylinder having a substantially uniform wall thickness, the jacket configured to define, in combination with the mold cavity insert and the mold cavity plate, a coolant-conveying channel.

10. The molding system of claim 9, wherein the mold cavity plate defines a bore configured to receive the mold cavity insert.

11. The molding system of claim 9, wherein the jacket is configured to be receivable within a bore defined by the mold cavity plate.

12. The molding system of claim 9, wherein the jacket is configured to receive the mold cavity insert.

13. The molding system of claim 9, wherein the coolant-conveying channel is configured to convey a coolant along the mold cavity insert at least in part.

14. The molding system of claim 9, wherein the mold cavity insert is configured to cooperate with a gate insert and a neck ring pair.

15. The molding system of claim 9, wherein the jacket includes a helical coil configured to surround the mold cavity insert.

16. The molding system of claim 9, wherein the jacket is configured to be affixed to the mold cavity insert.

17. The molding system of claim 9, wherein the mold cavity insert includes a pair of annular rims, the pair of annular rims is configured to retain the jacket to the mold cavity insert.

18. The molding system of claim 9, wherein the substantially uniform wall thickness is configured to be any one of:
between 3.5 and 6.4 millimeters;
less than about 5.4 millimeters; and
about 4.4 millimeters.

19. The molding system of claim 9, wherein the jacket includes a central pillar, the central pillar is configured to support a plurality of non-continuous loops extending transversely from alternating sides of the central pillar.

20. A molding system, comprising:
a mold cavity plate, the mold cavity plate configured to cooperate with a jacket, the mold cavity plate configured to receive a mold cavity insert defining a cylinder having a substantially uniform wall thickness, the jacket configured to define, in combination with the mold cavity insert and the mold cavity plate, a coolant-conveying channel.

21. The molding system of claim 20, wherein the mold cavity plate defines a bore configured to receive the mold cavity insert.

22. The molding system of claim 20, wherein the jacket is configured to be receivable within a bore defined by the mold cavity plate.

23. The molding system of claim 20, wherein the jacket is configured to receive the mold cavity insert.

24. The molding system of claim 20, wherein the coolant-conveying channel is configured to convey a coolant along the mold cavity insert at least in part.

25. The molding system of claim 20, wherein the mold cavity insert is configured to cooperate with a gate insert and a neck ring pair.

26. The molding system of claim 20, wherein the jacket includes a helical coil configured to surround the mold cavity insert.

27. The molding system of claim 20, wherein the jacket is configured to be affixed to the mold cavity insert.

28. The molding system of claim 20, wherein the mold cavity insert includes a pair of annular rims, the pair of annular rims is configured to retain the jacket to the mold cavity insert.

29. The molding system of claim 20, wherein the substantially uniform wall thickness is configured to be any one of:
between 3.5 and 6.4 millimeters;
less than about 5.4 millimeters; and
about 4.4 millimeters.

30. The molding system of claim 20, wherein the jacket includes a central pillar, the central pillar is configured to support a plurality of non-continuous loops extending transversely from alternating sides of the central pillar.

31. A mold, comprising:
a jacket configured to cooperate with a mold cavity plate, the mold cavity plate configured to receive a mold cavity insert defining a cylinder having a substantially uniform wall thickness, the jacket configured to define, in combination with the mold cavity insert and the mold cavity plate, a coolant-conveying channel.

32. The mold of claim 31, wherein the mold cavity plate defines a bore configured to receive the mold cavity insert.

33. The mold of claim 31, wherein the jacket is configured to be receivable within a bore defined by the mold cavity plate.

34. The mold of claim 31, wherein the jacket is configured to receive the mold cavity insert.

35. The mold of claim 31, wherein the coolant-conveying channel is configured to convey a coolant along the mold cavity insert at least in part.

36. The mold of claim 31, wherein the mold cavity insert is configured to cooperate with a gate insert and a neck ring pair.

37. The mold of claim 31, wherein the jacket includes a helical coil configured to surround the mold cavity insert.

38. The mold of claim 31, wherein the jacket is configured to be affixed to the mold cavity insert.

39. The mold of claim 31, wherein the mold cavity insert includes a pair of annular rims, the pair of annular rims is configured to retain the jacket to the mold cavity insert.

40. The mold of claim 31, wherein the substantially uniform wall thickness is configured to be any one of:
between 3.5 and 6.4 millimeters;
less than about 5.4 millimeters; and
about 4.4 millimeters.

41. The mold of claim 31, wherein the jacket includes a central pillar, the central pillar is configured to support a plurality of non-continuous loops extending transversely from alternating sides of the central pillar.

42. A mold, comprising:
a mold cavity plate, the mold cavity plate configured to cooperate with a jacket, the mold cavity plate configured to receive a mold cavity insert defining a cylinder having a substantially uniform wall thickness, the jacket configured to define, in combination with the mold cavity insert and the mold cavity plate, a coolant-conveying channel.

43. The mold of claim 42, wherein the jacket is configured to be receivable within a bore defined by the mold cavity plate.

44. The mold of claim 42, wherein the jacket is configured to receive the mold cavity insert.

45. The mold of claim 42, wherein the coolant-conveying channel is configured to convey a coolant along the mold cavity insert at least in part.

46. The mold of claim 42, wherein the mold cavity insert is configured to cooperate with a gate insert and a neck ring pair.

47. The mold of claim 42, wherein the jacket includes a helical coil configured to surround the mold cavity insert.

48. The mold of claim 42, wherein the jacket is configured to be affixed to the mold cavity insert.

49. The mold of claim 42, wherein the mold cavity insert includes a pair of annular rims, the pair of annular rims is configured to retain the jacket to the mold cavity insert.

50. The mold of claim 42, wherein the substantially uniform wall thickness is configured to be any one of:
between 3.5 and 6.4 millimeters;
less than about 5.4 millimeters; and
about 4.4 millimeters.

51. The mold of claim 42, wherein the jacket includes a central pillar, the central pillar is configured to support a plurality of non-continuous loops extending transversely from alternating sides of the central pillar.

52. For a mold of a molding system, the mold having a mold cavity plate configured to receive a mold cavity insert defining a cylinder having a substantially uniform wall thickness, a cooling component, comprising:
a jacket configured to define, in combination with the mold cavity insert and the mold cavity plate, a coolant-conveying channel.

53. The cooling component of claim 52, wherein the mold cavity plate defines a bore configured to receive the mold cavity insert.

54. The cooling component of claim 52, wherein the jacket is configured to be receivable within a bore defined by the mold cavity plate.

55. The cooling component of claim 52, wherein the jacket is configured to receive the mold cavity insert.

56. The cooling component of claim 52, wherein the coolant-conveying channel is configured to convey a coolant along the mold insert at least in part.

57. The cooling component of claim 52, wherein the mold cavity insert is configured to cooperate with a gate insert and a neck ring pair.

58. The cooling component of claim 52, wherein the jacket includes a helical coil configured to surround the mold cavity insert.

59. The cooling component of claim 52, wherein the jacket is configured to be affixed to the mold cavity insert.

60. The cooling component of claim 52, wherein the mold cavity insert includes a pair of annular rims, the pair of annular rims is configured to retain the jacket to the mold cavity insert.

61. The cooling component of claim 52, wherein the substantially uniform wall thickness is configured to be any one of:
 between 3.5 and 6.4 millimeters;
 less than about 5.4 millimeters; and
 about 4.4 millimeters.

62. The cooling component of claim 52, wherein the jacket includes a central pillar, the central pillar is configured to support a plurality of non-continuous loops extending transversely from alternating sides of the central pillar.

* * * * *